(12) United States Patent
Lu et al.

(10) Patent No.: US 10,873,280 B2
(45) Date of Patent: Dec. 22, 2020

(54) METHODS AND APPARATUS FOR MOTOR STARTUP WITH SINUSOIDAL PHASE CURRENT

(71) Applicant: Allegro MicroSystems, LLC, Manchester, NH (US)

(72) Inventors: Yisong Lu, Shrewsbury, MA (US); Lyndon Ambruson, Warren, MA (US)

(73) Assignee: Allegro MicroSystems, LLC, Manchester, NH (US)

( * ) Notice: Subject to any disclaimer, the term of this patent is extended or adjusted under 35 U.S.C. 154(b) by 332 days.

(21) Appl. No.: 15/374,154

(22) Filed: Dec. 9, 2016

(65) Prior Publication Data

US 2018/0167011 A1    Jun. 14, 2018

(51) Int. Cl.
*H02P 6/16* (2016.01)
*H02P 6/22* (2006.01)

(52) U.S. Cl.
CPC . *H02P 6/16* (2013.01); *H02P 6/22* (2013.01)

(58) Field of Classification Search
CPC ...... H02P 6/08; H02P 6/14; H02P 6/16; H02P 6/182; H02K 29/12; H02K 29/08; H02M 7/53873; H02M 7/53875
USPC ......... 318/609, 610, 400.01, 400.38, 400.39, 318/599, 811
See application file for complete search history.

(56) References Cited

U.S. PATENT DOCUMENTS

| | | | | |
|---|---|---|---|---|
| 8,030,918 B2 * | 10/2011 | Doogue | ............. | G01R 33/0023 324/251 |
| 8,729,892 B2 * | 5/2014 | Friedrich | ........... | G01R 33/0005 324/247 |
| 9,083,273 B2 * | 7/2015 | Brannen | .................... | H02P 6/18 |
| 9,172,320 B2 | 10/2015 | Reynolds et al. | | |
| 9,203,339 B2 | 12/2015 | Sato | | |
| 9,281,769 B2 | 3/2016 | Reynolds et al. | | |
| 9,929,683 B2 | 3/2018 | Sonoda et al. | | |
| 2008/0273865 A1 * | 11/2008 | Alberkrack | ............... | H02P 6/14 388/811 |
| 2012/0249133 A1 * | 10/2012 | Friedrich | ........... | G01R 33/0005 324/247 |
| 2012/0326643 A1 * | 12/2012 | Brannen | .................... | H02P 6/18 318/400.11 |

(Continued)

FOREIGN PATENT DOCUMENTS

TW    201206048 A    2/2012

OTHER PUBLICATIONS

U.S. Appl. No. 15/184,159, filed Jun. 16, 2016, Lu et al.

(Continued)

*Primary Examiner* — Rina I Duda
(74) *Attorney, Agent, or Firm* — Daly Crowley Mofford & Durkee, LLP (57) ABSTRACT

Methods and apparatus for controlling a three-phase motor and providing sinusoidal phase currents during startup. In embodiments, differential outputs from a magnetic field sensing element are used to generate a polarity signal used to provide a motor direction drive signal. An amplitude signal derived from the magnetic field sensing element and a measured motor current are used to generate a current amplitude signal. A PWM module generates signals for driving the motor with sinusoidal phase currents from the current amplitude signal and the motor direction drive signal.

32 Claims, 12 Drawing Sheets

(56) References Cited

U.S. PATENT DOCUMENTS

2014/0055064 A1* 2/2014 Ng .................... H02P 6/182
318/400.11
2020/0021212 A1 1/2020 Yamada et al.
2020/0028456 A1 1/2020 Morioka et al.

OTHER PUBLICATIONS

U.S. Appl. No. 15/149,448, filed May 9, 2016, Lu.
U.S. Appl. No. 15/184,163, filed Jun. 16, 2016, Lu et al.
Taiwan Office Action (with English Translation) dated Sep. 6, 2018, for Taiwan Application No. 106140695; 22 Pages.
Response (with English Translation and Amended Claims) to Taiwan Office Action dated Sep. 6, 2018 for Taiwan Application No. 106140695; Response filed on Nov. 9, 2018; 20 Pages.
Taiwan Allowance Decision (with English Translation) dated Apr. 2, 2019 for Taiwan Application No. 106140695; 4 Pages.

\* cited by examiner

The eight inverter voltage vectors ($V_0$ to $V_7$)

METHODS AND APPARATUS FOR MOTOR STARTUP WITH SINUSOIDAL PHASE CURRENT

BACKGROUND

A variety of circuits to control and drive brushless DC (BLDC) electric motors are known. Conventional BLDC motor control techniques may employ BEMF (back emf) information for position estimation, however, BEMF information is not available at zero speed, for example, at motor startup. Another conventional startup technique is to drive the motor in open loop without position estimation (e.g., align and go for example), which may cause reverse rotation during startup. In addition, this technique may increase startup time if a relatively conservative startup profile is chosen, or, render motor startup unreliable if an aggressive startup profile is chosen.

It is known that some three-phase BLDC motor startup techniques can use a Hall sensor. Other techniques use sensor-less control. The various startup techniques may have advantages and disadvantages. For example, a conventional Hall effect sensor-based startup configuration typically three Hall elements, one for each phase. Hall effect sensor configurations may provide relatively reliable startup, fast startup, and adaptation to different motors and load conditions without changing the parameters for the controller. Typical Hall effect sensor startup techniques produce a rectangular current in which the changing phase of the current is relatively unsmooth so as to generate acoustic noise.

Sensor-less techniques eliminate the cost of Hall sensors and may have improved manufacturability. However, without a position sensor, open-loop startup is the only viable option. The open loop startup profile may be programmed by a customer or by the manufacturer based on motor parameters and load conditions, which can be a challenging process because a conservative (slow) profile may make the startup relatively slow, and an aggressive (fast) profile may reduce the safety margin, possibly resulting in startup failure for certain conditions.

SUMMARY

Embodiments provide methods and apparatus for a BLDC motor controller including a magnetic field sensing element having an output that is processed to generate polarity and amplitude signals for regulating an output current to reduce acoustic noise during startup in comparison with conventional systems. Embodiments of the invention reduce tradeoffs between acoustic noise during startup and slow startup times.

In one aspect of the invention, a method for three-phase motor startup comprises: receiving differential outputs from a magnetic field sensing element; generating a polarity signal from the differential outputs; generating an amplitude signal from the differential outputs; generating a motor direction drive signal from the polarity signal; and generating sinusoidal motor drive signals during the motor startup from a measured motor current signal and the amplitude signal.

The method can further include one or more of the following features: the magnetic field sensing element comprises a Hall element, the sinusoidal motor drive signals during motor startup are generated from a single Hall element, which comprises the magnetic field sensing element, the motor direction drive signal corresponds to a position of the signal Hall element in relation to phases of the motor, a comparator to generate the polarity signal, rectifying the differential outputs to generating the amplitude signal, a proportional-integral (PI) controller to generate a control vector amplitude signal for a PWM signal generator from the amplitude signal and the measured motor current, the magnetic field sensing element comprises an anisotropic magnetoresistance (AMR) element, the magnetic field sensing element comprises a giant magnetoresistance (GMR) element, the magnetic field sensing element comprises a tunneling magnetoresistance (TMR) element, and/or the motor comprises a brushless DC motor.

In another aspect of the invention, a motor controller system comprises: a control module configured to receive polarity information from a magnetic field sensing element positioned in relation to phases of a three-phase motor, motor current information, and amplitude information from the magnetic field sensing element, and to generate a motor driving direction signal corresponding to the received polarity information and to generate an amplitude control signal from the amplitude information and the motor current information; and a pulse width modulation (PWM) module configured to receive the amplitude control signal and the motor driving direction signal and generate control signals for switching elements driving the motor that provide sinusoidal phase currents to the motor during startup.

The system can further include one or more of the following features: the magnetic field sensing element comprises a Hall element, the sinusoidal motor drive signals during motor startup are generated from a single Hall element, which comprises the magnetic field sensing element, the motor direction drive signal corresponds to a position of the signal Hall element in relation to phases of the motor, a comparator to generate the polarity signal, rectifying the differential outputs to generating the amplitude signal, a proportional-integral (PI) controller to generate a control vector amplitude signal for a PWM signal generator from the amplitude signal and the measured motor current, the magnetic field sensing element comprises an anisotropic magnetoresistance (AMR) element, the magnetic field sensing element comprises a giant magnetoresistance (GMR) element, the magnetic field sensing element comprises a tunneling magnetoresistance (TMR) element, and/or the motor comprises a brushless DC motor.

In a further aspect of the invention, a motor controller system comprises: a control means for receiving polarity information from a magnetic field sensing element positioned in relation to phases of a three-phase motor, motor current information, and amplitude information from the magnetic field sensing element, and to generate a motor driving direction signal corresponding to the received polarity information and to generate an amplitude control signal from the amplitude information and the motor current information; and a pulse width modulation (PWM) means for receiving the amplitude control signal and the motor driving direction signal and generate control signals for switching elements driving the motor that provide sinusoidal phase currents to the motor during startup.

The system can further include one or more of the following features: the magnetic field sensing element comprises a Hall element, the sinusoidal motor drive signals during motor startup are generated from a single Hall element, which comprises the magnetic field sensing element, the motor direction drive signal corresponds to a position of the signal Hall element in relation to phases of the motor, a comparator to generate the polarity signal, rectifying the differential outputs to generating the amplitude signal, a proportional-integral (PI) controller to generate a control vector amplitude signal for a PWM signal generator from the amplitude signal and the measured motor current, the magnetic field sensing element comprises an anisotropic magnetoresistance (AMR) element, the magnetic field sensing element comprises a giant magnetoresistance (GMR) element, the magnetic field sensing element comprises a tunneling magnetoresistance (TMR) element, and/or the motor comprises a brushless DC motor.

BRIEF DESCRIPTION OF THE DRAWINGS

The foregoing features of this invention, as well as the invention itself, may be more fully understood from the following description of the drawings in which.

DETAILED DESCRIPTION

Figure 1:
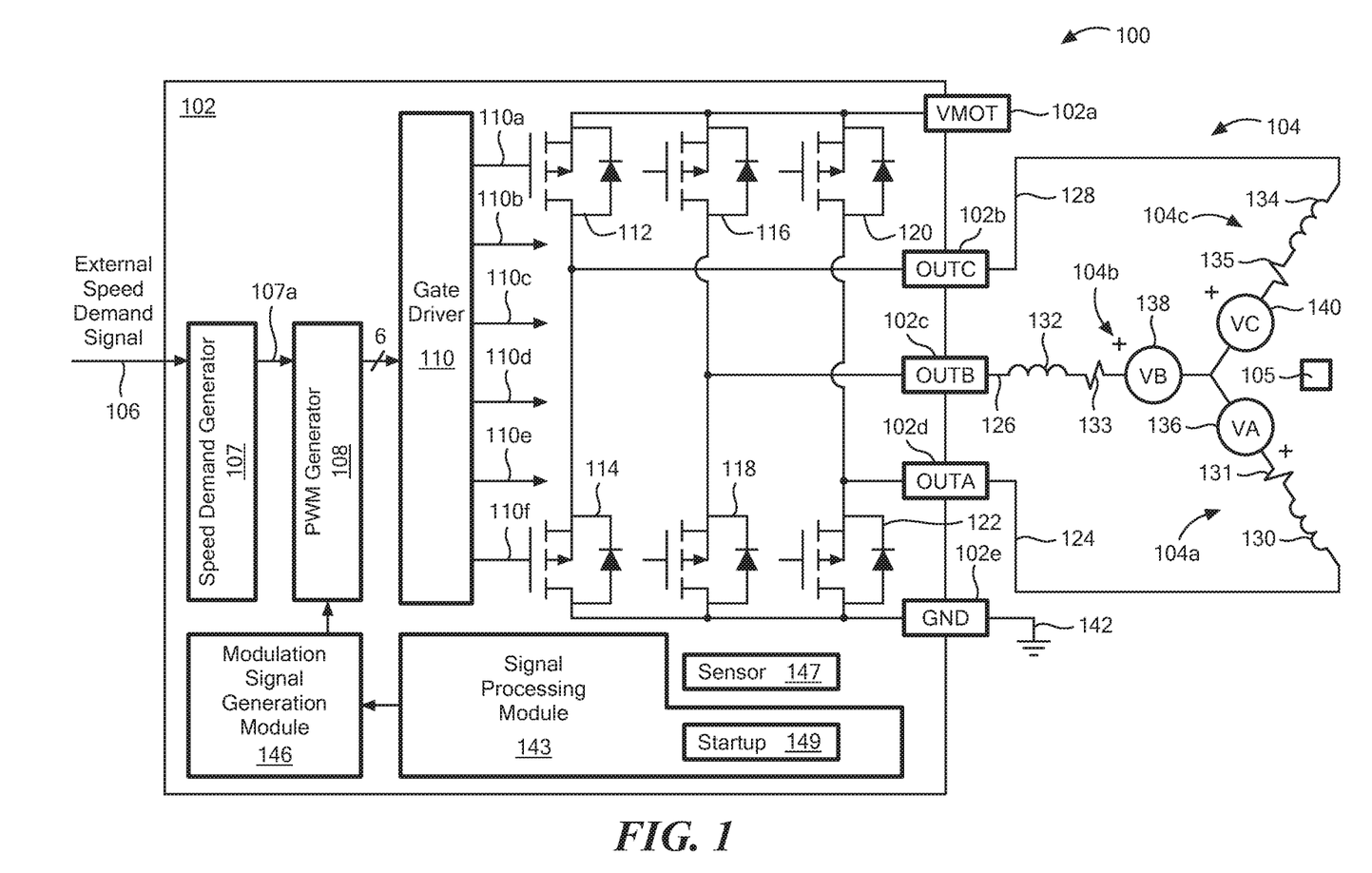
FIG. 1 is a schematic representation of a motor controller having sinusoidal phase current during startup in accordance with example embodiments of the invention.

FIG. 1 shows an example motor control circuit 102 coupled to an electric motor 104 for providing BLDC motor startup with enhanced startup in accordance with example embodiments of the invention. In embodiments, information from a single magnetic sensing element 105, such as a Hall element, is used to control motor startup and reduce acoustic noise by generating sinusoidal phase currents during motor startup, as described more fully below.

Figure 1A:
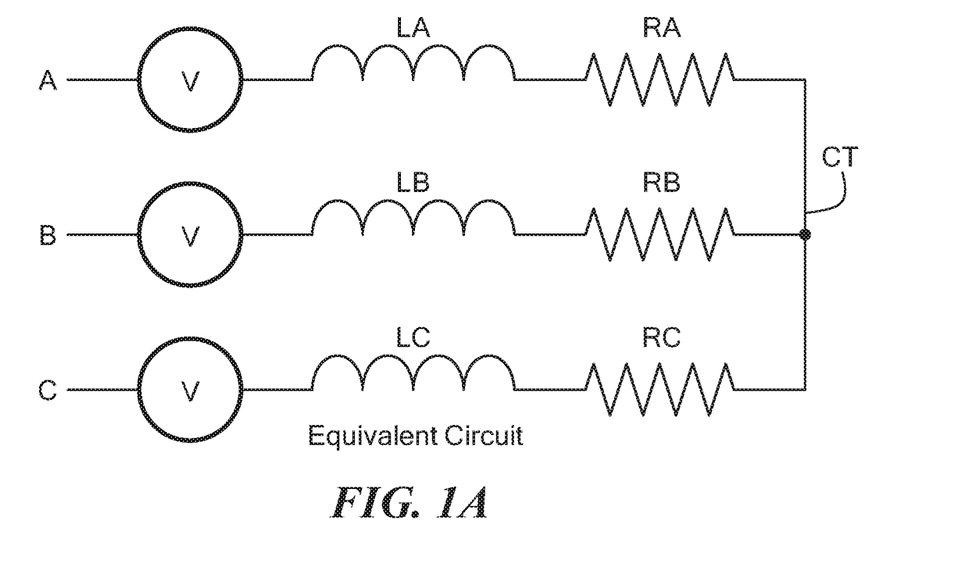
FIG. 1A shows an illustrative equivalent circuit for a portion of a three-phase motor.

The motor 104 is shown to include three windings 104a, 104b, 104c, which can be depicted as a respective equivalent circuit having an inductor in series with a resistor and in series with a back EMF (BEMF) voltage source. For example, the winding A 104a is shown to include an inductor 130 in series with a resistor 131 and in series with a back EMF voltage source VA 136. An example equivalent circuit is shown in FIG. 1A.

The motor control circuit 102 includes a speed demand generator 107 coupled to receive an external speed demand signal 106 from outside of the motor control circuit 102. The external speed demand signal 106 can be in one of a variety of formats. In general the external speed demand signal 106 is indicative of a speed of the motor 104 that is requested from outside of the motor control circuit 102.

The speed demand generator 107 is configured to generate a speed demand signal 107a. A pulse width modulation (PWM) generator 108 is coupled to receive the speed demand signal 107a and configured to generate PWM signals having a duty cycle that is controlled by the speed demand signal 107a. The PWM generator 108 is also coupled to receive modulation waveforms from a modulation signal generation module 146. The PWM signals are generated with a modulation characteristic (i.e., a relative time-varying duty cycle) in accordance with the modulation waveforms.

The motor control circuit 102 also includes a gate driver circuit 110 coupled to receive the PWM signals and configured to generate PWM gate drive signals 110a, 110b, 110c, 110d, 110e, 110f to drive six transistors 112, 114, 116, 118, 120, 122 arranged as three half-bridge circuits 112/114, 116/118, 120/122. The six transistors 112, 114, 116, 118, 120, 122 operate in saturation to provide three motor drive signals VoutA, VoutB, VoutC, 124, 126, 128, respectively, at nodes 102d, 102c, 102b, respectively. It is understood that any suitable configuration of switching elements can be used to provide the motor drive signals.

The motor control circuit 102 can also include a signal processing module 143 for processing signals from a sensor module 147. In embodiments, the signal processing module 143 can include a startup module 149 to control motor startup. As described more fully below, motor phase current polarity and amplitude information from the magnetic sensing element 105 and motor current information can be used to enhance motor startup as compared with known startup techniques. The sensor module 147 can be configured to receive back EMF signal(s) (e.g., can be coupled to receive one or more of the motor drive signals 124, 126, 128, which include back EMF signals directly observable at times when the motor windings 104a, 104b, 104c are not being driven and respective winding currents are zero).

Figure 1B:
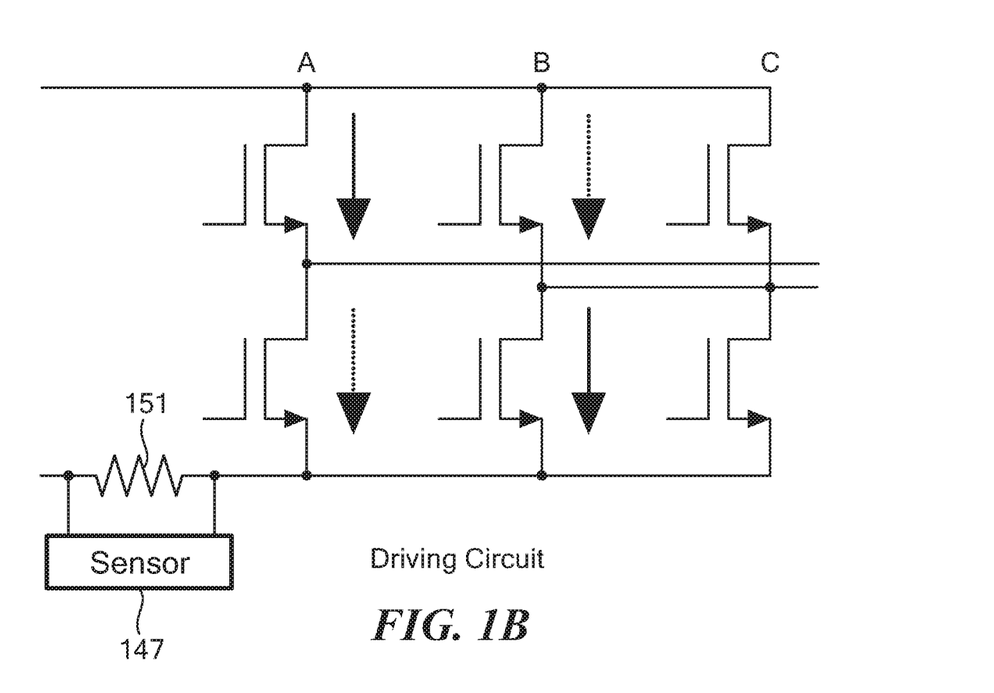
FIG. 1B is a schematic representation of a circuit for measuring phase signals in the circuit of FIG. 1.

FIG. 1B shows an example embodiment of the sensor module 147 to receive a voltage across a shunt resistor 151 coupled to the switching element pairs. It is understood that any suitable sensor and sensor processing technique can be used to measure and process motor current information.

Referring again to FIG. 1, the signal processing module 143 is configured to generate a position reference signal indicative of a rotational reference position of the motor 104. The modulation signal generation module 146 is coupled to receive the position reference signal and configured to change a phase of the modulation waveforms provided to the PWM generator 108.

The motor control circuit 102 can be coupled to receive a motor voltage VMOT, or simply VM, at a node 102a, which is supplied to the motor through the transistors 112, 116, 120 during times when the upper transistors 112, 116, 120 are turned on. It will be understood that there can be a small voltage drop (for example, 0.1 volts) through the transistors 112, 116, 120 when they are turned on and supplying current to the motor 104.

Figure 2:
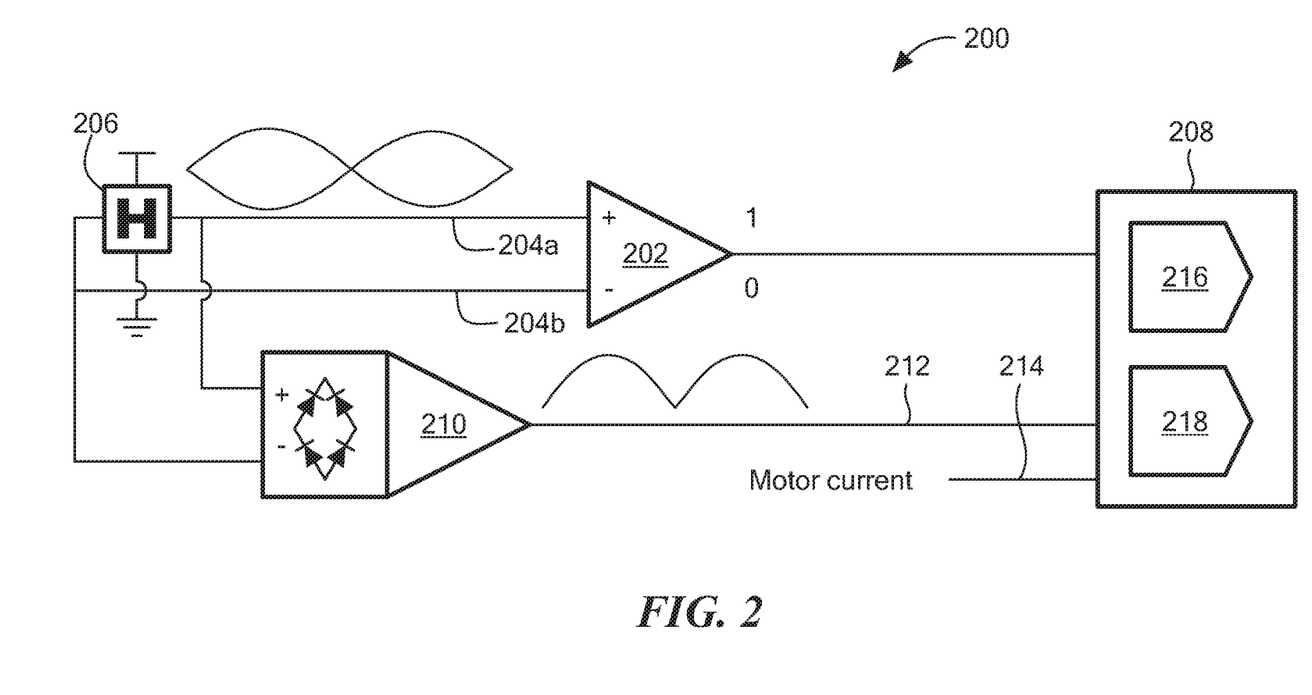
FIG. 2 shows an example implementation of a portion of the motor controller of FIG. 1.

FIG. 2 shows a portion of a startup module 200, which can correspond to the startup module 149 of FIG. 1, including a comparator 202 to receive the differential outputs 204a,b of a Hall element 206. In embodiments, the differential outputs 204a,b of the Hall elements are sinusoidal. The Hall element 206 can correspond to the magnetic sensing element 105 of FIG. 1, which detects the position of the motor. An output of the comparator 202 is coupled to a control module 208.

The comparator output, which can be a logical ONE or ZERO, indicates the polarity of the Hall output signals.

Figure 2A:
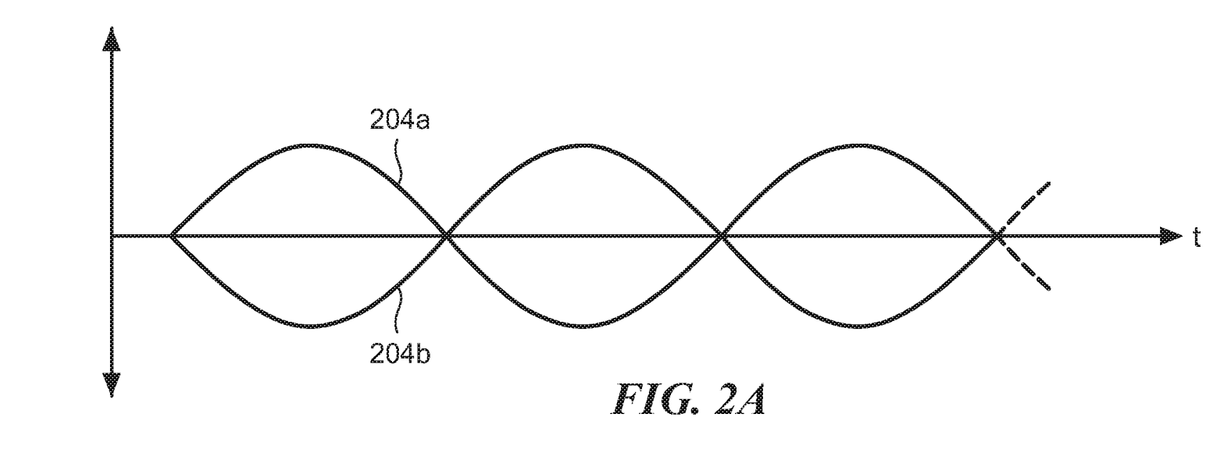
FIG. 2A is an example waveform of differential Hall element outputs.
Figure 2B:
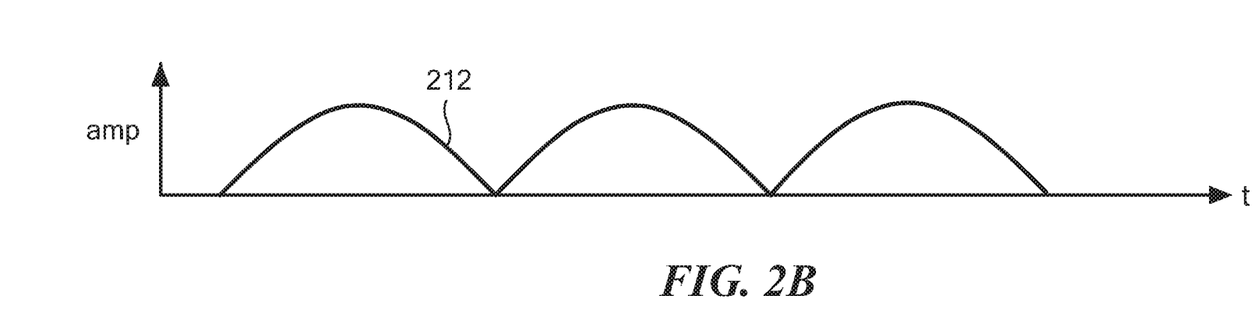
FIG. 2B is an example waveform of the differential Hall element outputs of FIG. 2A after rectification.

The differential Hall element outputs 204a,b are also coupled to a rectifier module 210, which generates a rectifier signal 212. In embodiments, the rectifier signal provides an absolute function of the Hall element outputs 204a,b. FIG. 2A shows example waveforms for the Hall outputs 204a,b and the rectifier signal 212. It is understood that the rectifier signal 212 corresponds to an amplitude of the Hall outputs 204a,b.

Referring again to FIG. 2, a measured motor current signal 214 is provided to the control module 208, which also receives the rectifier signal 212 and the comparator 202 output signal. The control module 208 includes a polarity control loop 216 that determines in which direction the motor should be driven. The control module 208 also includes a current amplitude control loop 218 which determines the current amplitude that should drive the motor. Because the profile of the reference of the driving current is sinusoidal, the output current is also sinusoidal.

Figure 3:
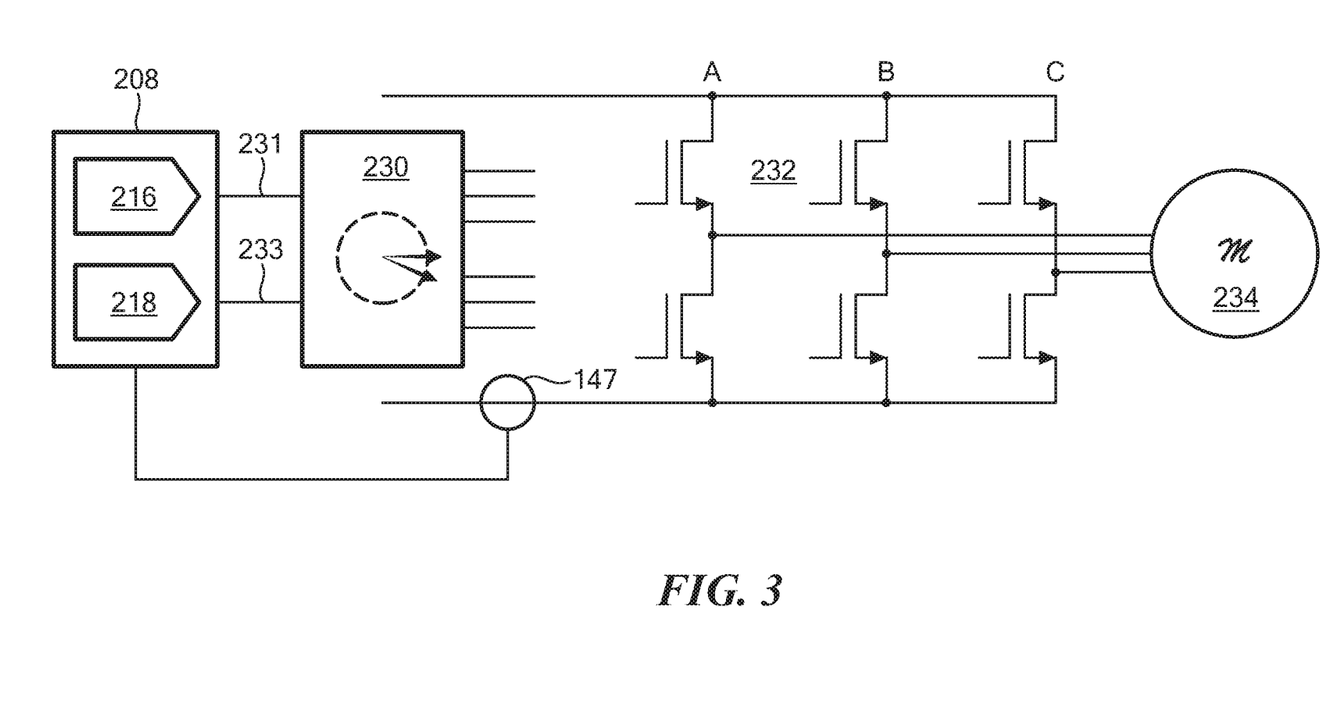
FIG. 3 is a schematic representation of further portion of the motor controller of FIG. 1.

FIG. 3 shows the control module 208, which can be connected to a sensor module 147 such as that shown in FIG. 1B, coupled to a PWM generator module 230 which receives position 231 and amplitude information 233 from the control module. The PWM generator module 230 converts the position and amplitude information to a corresponding PWM duty cycle and provides switching control signals to a bridge circuit 232, which is illustrated as a transistor H-bridge circuit. The bridge circuit 232 generates the signals for driving each phase A, B, C of the motor 234. As described more fully below, the drive signals to the motor can be regulated using Hall element amplitude to smoothen the motor commutation.

Figure 4:
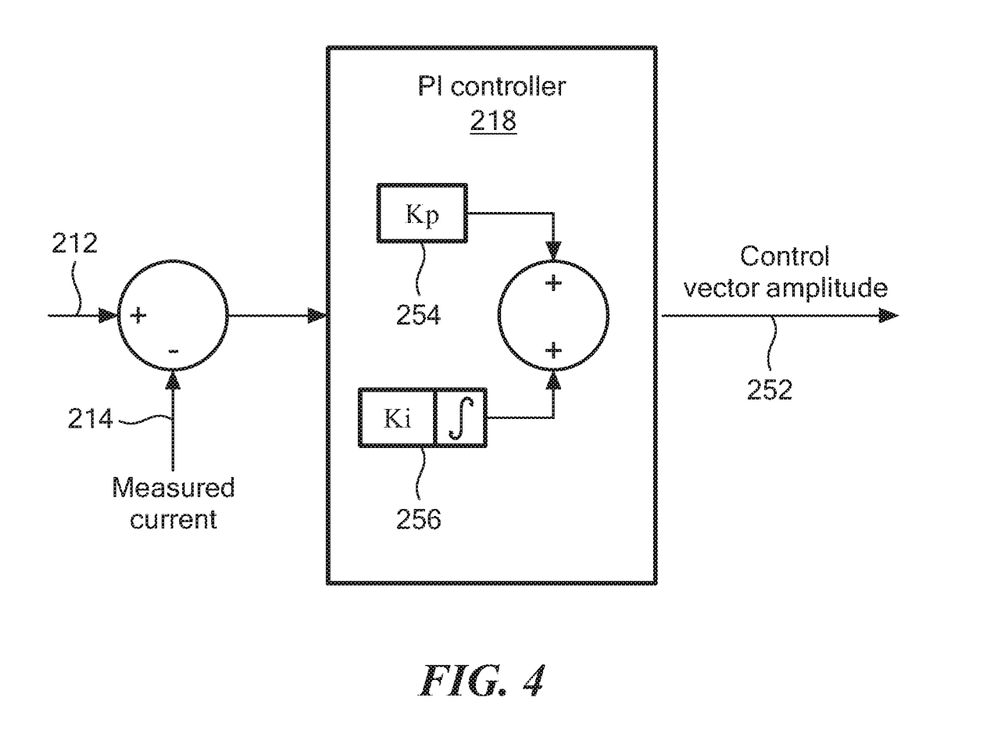
FIG. 4 is a schematic representation of an example implementation of a portion of the motor controller of FIG. 3.

FIG. 4 shows an example implementation of the motor current control loop 218 of FIG. 3 including a proportional-integral-derivative (PID) controller 250 that generates control vector amplitude signal 252 for controlling the motor. The rectifier signal 212, which represents an absolute value of the Hall element differential outputs, provides an absolute rectified sinusoidal reference signal that is subtracted by the motor current 214. The result output is provided as an input to the PI controller 250, which includes a Kp module 254 and a Ki module 256. It is understood that Kp and Ki represent coefficients for the proportional and integral derivative terms. A derivative coefficient Kd can also be used. P accounts for present values of the motor current error, I accounts for past values of the error, and D accounts for possible future values of the error, based on a current rate of change. By tuning the coefficients, the PID controller 250 can perform in accordance with specific process requirements.

While a PID controller is shown and described, it is understood that any suitable technique can be used to process the amplitude and measured current information to generate sinusoidal phase currents. For example, cycle by cycle current limit information can be used.

It is understood that the Hall element output may not have a perfectly sinusoidal profile. In embodiments, the Hall element output is at least substantially sinusoidal with a profile having relatively smooth ramping up and ramping down characteristics. In contrast to conventional systems that generate a rectangular current, which has sharp rising edges and falling edges that cause acoustic noise, embodiments of the invention provide significantly improved acoustic performance.

Figure 5:
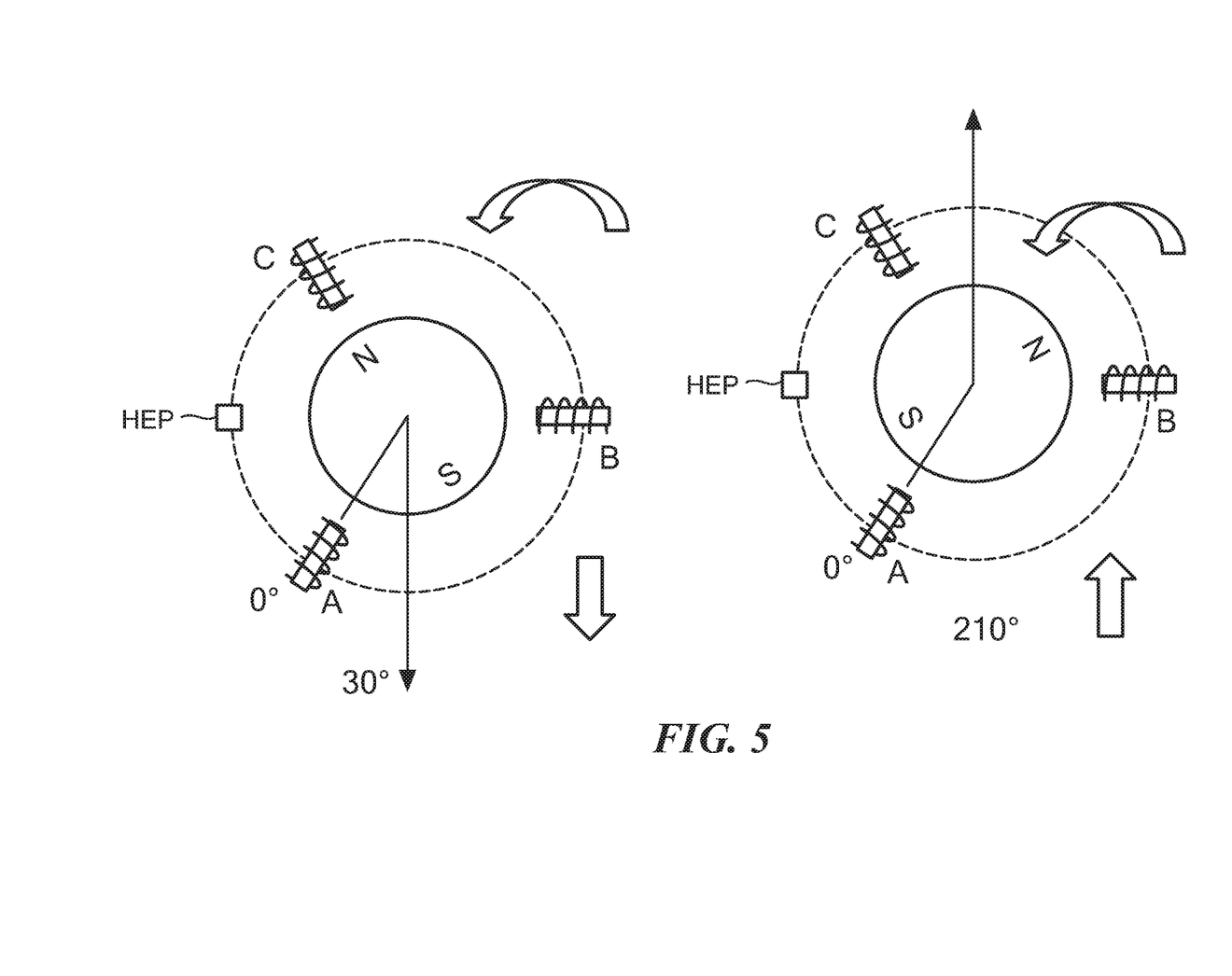
FIG. 5 is a schematic representation of a Hall element positioned in relation to motor phases for providing a motor driving vector direction.

FIG. 5 shows an example implementation of the polarity control loop 216 of FIG. 2 that generates a driving vector direction signal, which is provided to the PWM generator module 230 (FIG. 3). In embodiments, the driving vector direction is perpendicular to the Hall element HEP position. In the illustrated embodiment, the driving vector direction is either up or down depending upon the comparator 202 (FIG. 2) ZERO or ONE output based upon the position of the Hall element HEP, which is horizontal in the illustrated embodiment. Motor winding A is defined as the zero degree position so the motor running direction is counterclockwise. In the illustrated embodiment, motor windings A, B, and C are shown spaced at 120 degrees. The driving position is then:

Hall comparator output=0: 210 degrees
Hall comparator output=1: 30 degrees.

Figure 6:
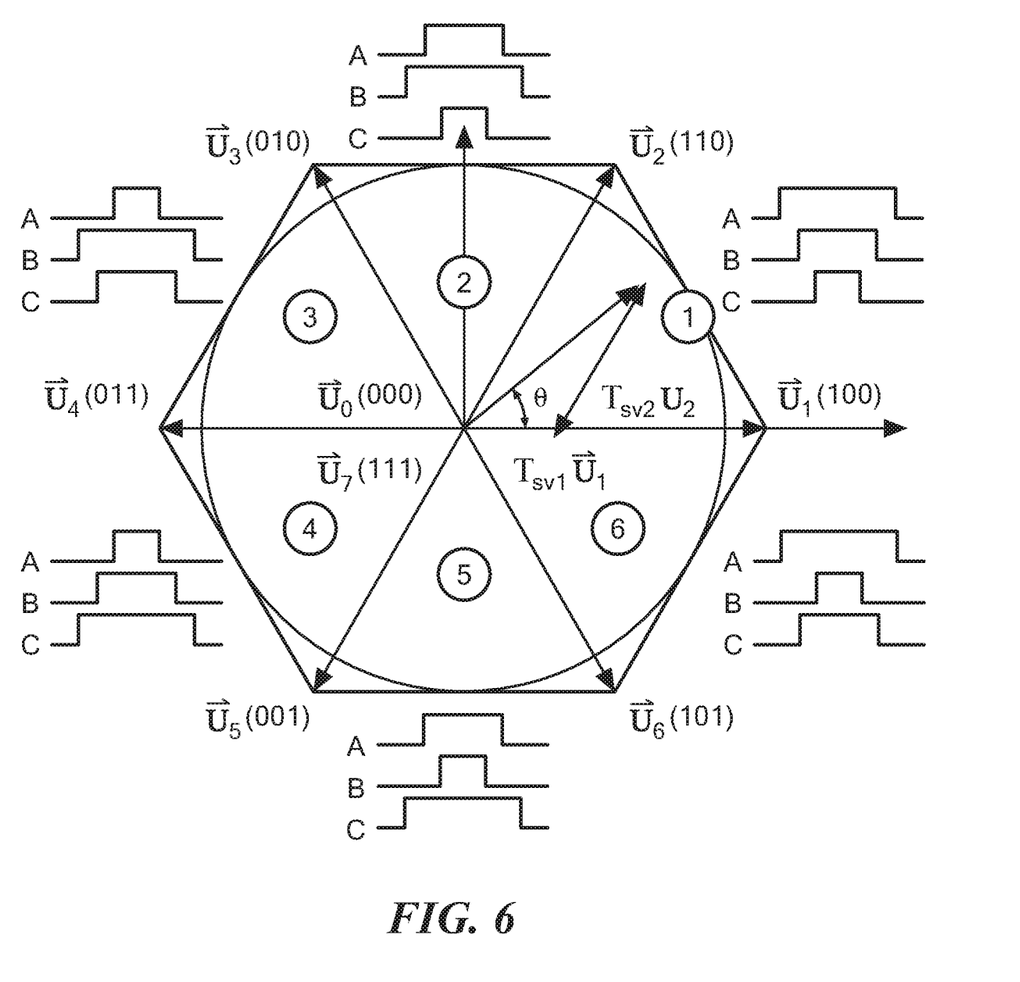
FIG. 6 is a diagram showing an illustrative technique for generating pulse width modulation signals to drive the motor phases.

FIG. 6 shows one particular implementation of the PWM generator module 230 of FIG. 3 in which space vector pulse width modulation (SVPWM) is used to generate the three-phase switching element control signals from the polarity 231 and amplitude 233 information from control module 208 (FIG. 3). As shown, in embodiments the switching state of the three-phase inverter forms eight space voltage vectors. The eight vectors include six active voltage vectors (U1 to U6) and two zero voltage vectors (U0 and U7), where U0 and U7 are at the origin and no voltage is supplied to the load. An arbitrary voltage vector with amplitude Uo (e.g., 231 FIG. 3) and position θ (E.g., 233 FIG. 3) inside the hexagon region can be generated by a zero vector and two active vectors that are starting and ending boundaries of the sector.

Figure 6A:
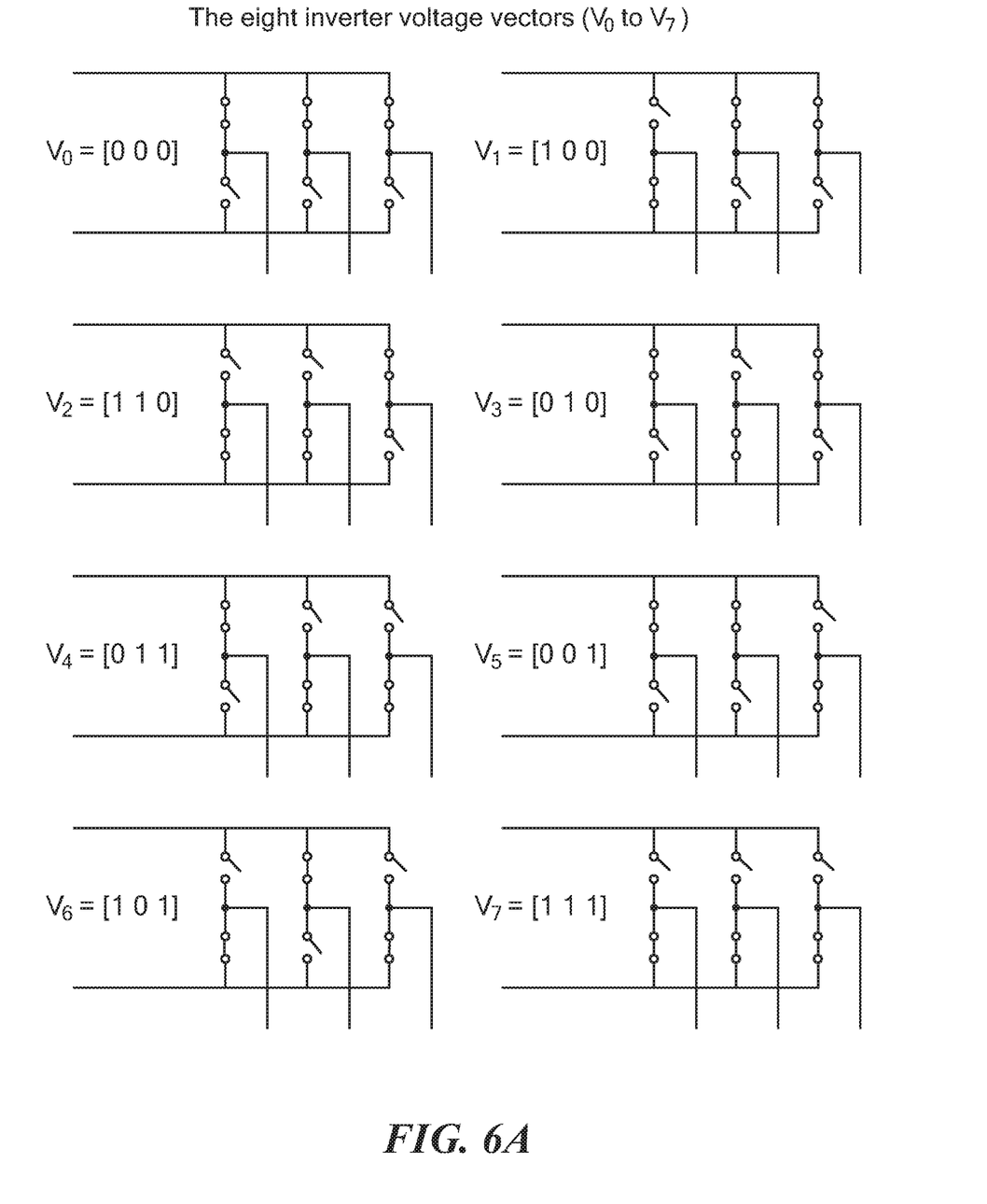
FIG. 6A is a diagram showing conductive states corresponding to FIG. 6 for switching element pairs.

FIG. 6A shows the eight voltage vectors for the six-transistor inverter generating phase signals for the motor. It is understood that for each transistor pair coupled across the voltage rail, only one transistor will be conductive at a given time.

Figure 7A:
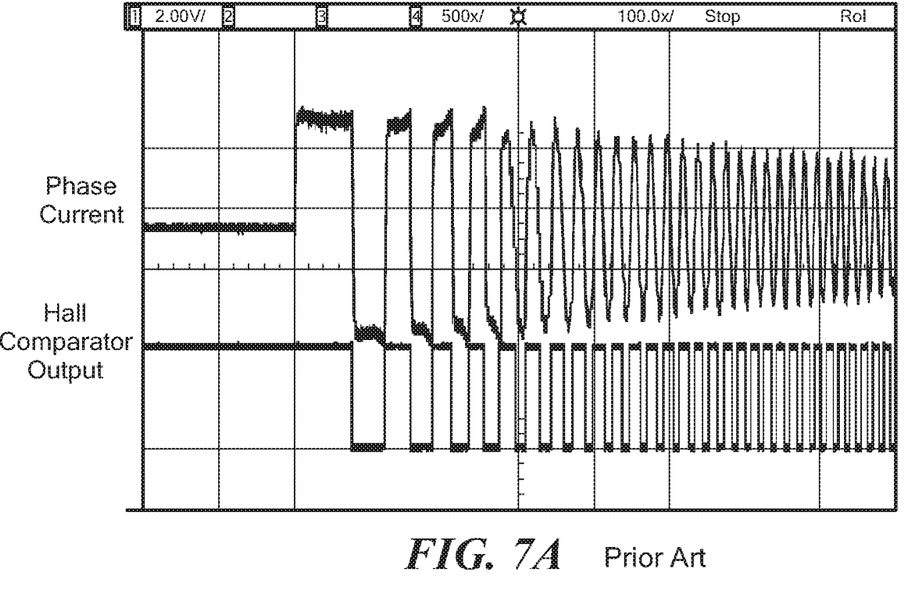
FIG. 7A shows a Hall element comparator output and conventional phase current.
Figure 7B:
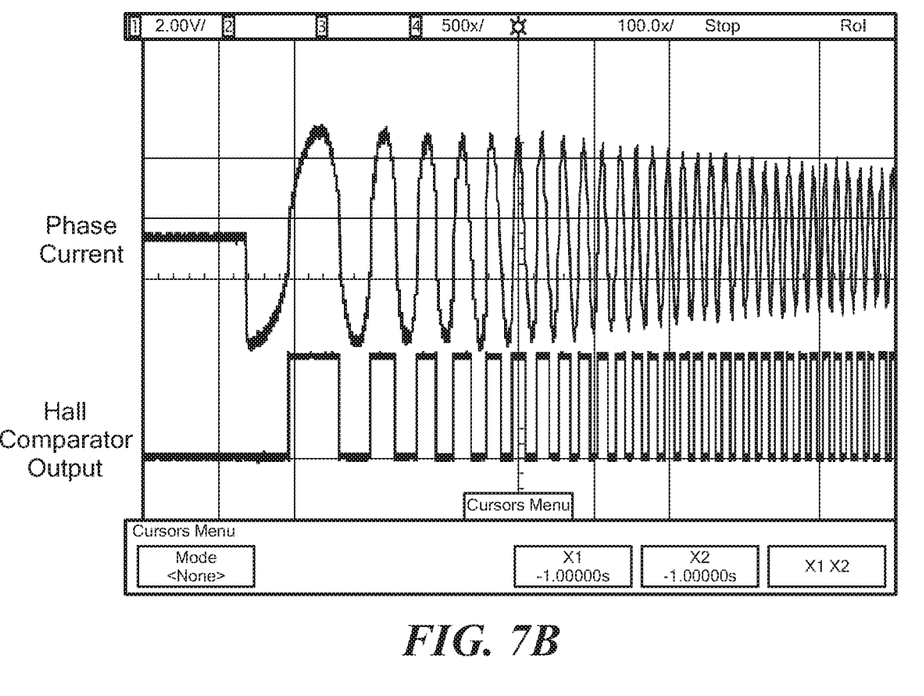
FIG. 7B shows a Hall element comparator output and a generally sinusoidal phase current.

FIGS. 7A and 7B shows example phase current waveforms. FIG. 7A shows a Hall element comparator output and conventional phase current, which has a rectangular profile. FIG. 7B shows a Hall element comparator output, such as comparator 202 in FIG. 2, for determining motor drive direction, and a generally sinusoidal phase current in accordance with illustrative embodiments of the invention. As described above, by using the Hall element output signal amplitude in addition to the Hall element output signal polarity, the phase current to the motor has a sinusoidal profile that reduces the amount of acoustic noise during startup. As noted above, the reference signal (e.g., from the rectifier) for the driving current is sinusoidal for generating a phase current that is sinusoidal.

It is understood that a variety of suitable techniques, components and processing can be used to effect PWM control over the switching elements that drive the phases A, B, C of the motor to meet the requirements of a particular application without departing from the scope of the claimed invention.

While illustrative embodiments of the invention are shown and described in conjunction with a magnetic field sensing element comprising a Hall element, it is understood that any suitable type of magnetic field sensing element can be used.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Figure 8:
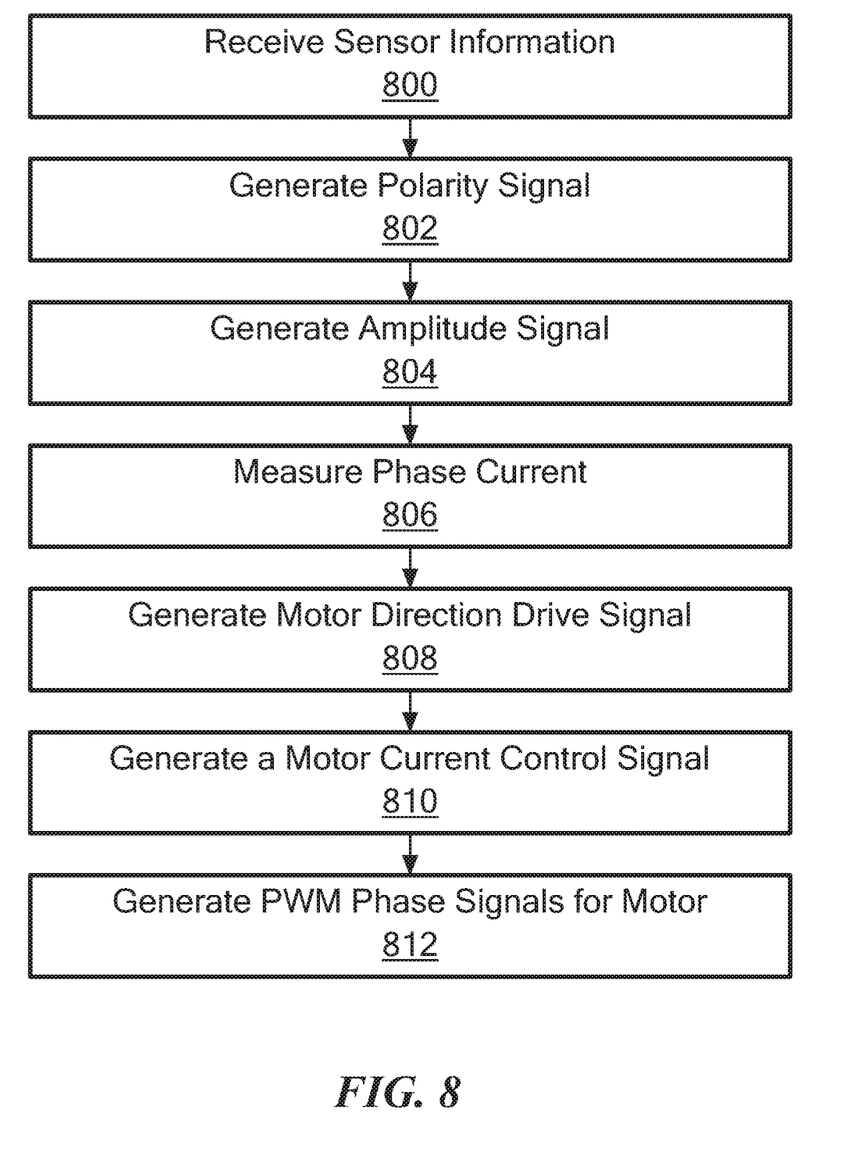
FIG. 8 is a flow diagram showing an example sequence of steps for providing motor startup in accordance with illustrative embodiments of the invention.

FIG. 8 shows an example sequence of steps for providing sinusoidal phase currents to a three-phase motor during startup. In step 800, the differential output from a magnetic sensing element, such as a Hall element is received. In step 802, a polarity signal is generated from the differential output to drive the motor in a particular direction. In step 804, an amplitude signal is generated from the differential outputs, such as by rectification. In step 806, motor phase current is measured. In step 808, a motor direction drive signal is generated from the polarity signal. In embodiments, differential outputs from a Hall element positioned in relation to the motor windings are provided to a comparator for generating the polarity signal.

In step 810, a motor current control signal is generated. In example embodiments, a PID controller receives the measured phase current information and the rectified differential Hall output signals, which provides a reference signal. In step 812, the motor direction drive signal and the motor current control signal are provided to a PWM signal generator that provides control signals to the switching elements for controlling the phase currents to the motor. In example embodiments, SVPWM processing is used to generate the three-phase switching element control signals.

Embodiments of the invention may provide advantages over conventional open loop motor startup techniques. For example, embodiments of the invention eliminate a trade off between reliable startup and fast startup which is required in known startup techniques. In addition, embodiments of the invention do not require motor by motor or load by load programming of a startup profile. Further, embodiments of the invention may achieve faster startup when loading is relatively light, as compared to traditional motor startup techniques. Embodiments of the invention may also provide reliable startup in the presence of motor load increases and/or the presence of external forces during startup.

Embodiments of the invention may also provide advantages over traditional Hall sensor-based solutions. For example, embodiments of the invention may provide softer commutation by use of a sinusoidal current profile for enhanced acoustic performance. Also, in embodiments, a single Hall element may be used in comparison with conventional Hall sensor-based startup techniques, which requires three Hall sensors.

Figure 9:
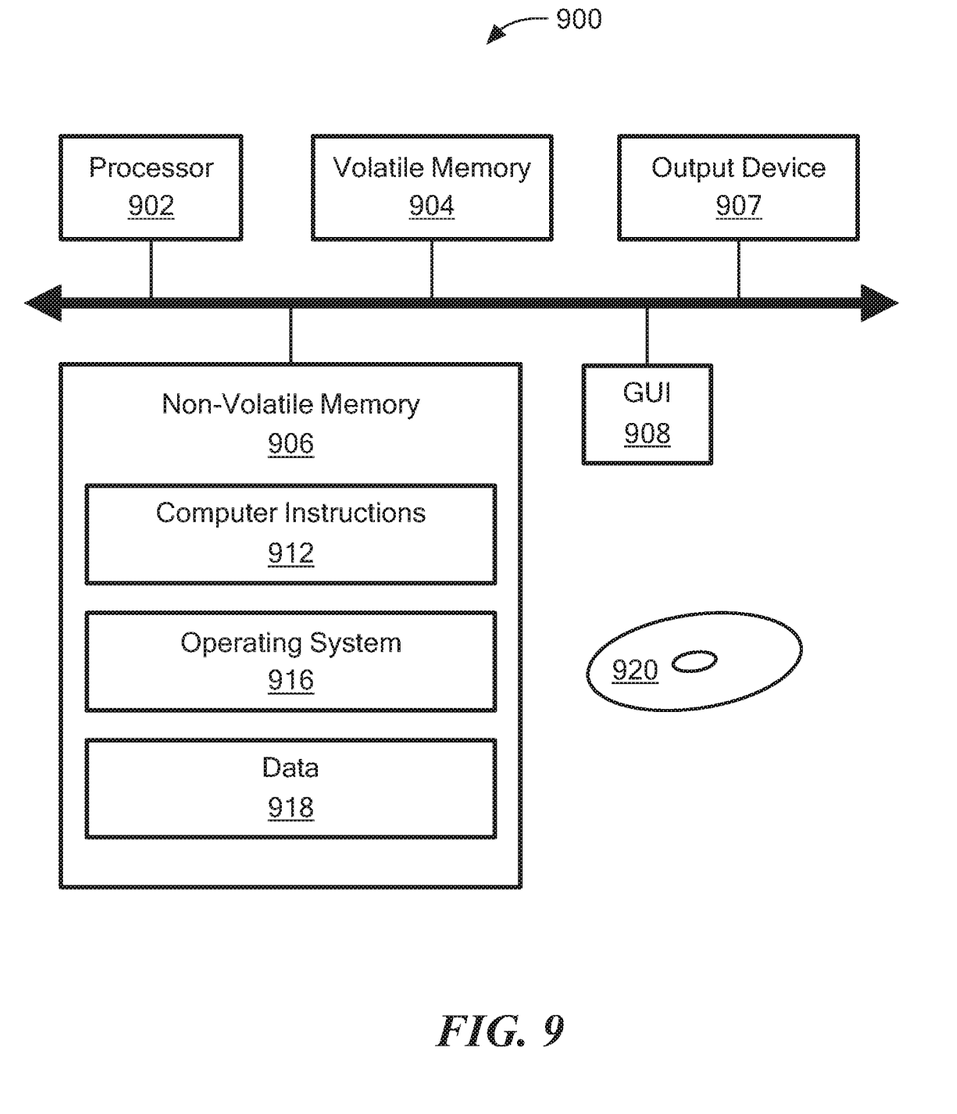
FIG. 9 is a schematic representation of an example computer that can perform at least a portion of the processing described herein.

FIG. 9 shows an exemplary computer 900 that can perform at least part of the processing described herein. The computer 900 includes a processor 902, a volatile memory 904, a non-volatile memory 906 (e.g., hard disk), an output device 907 and a graphical user interface (GUI) 908 (e.g., a mouse, a keyboard, a display, for example). The non-volatile memory 906 stores computer instructions 912, an operating system 916 and data 918. In one example, the computer instructions 912 are executed by the processor 902 out of volatile memory 904. In one embodiment, an article 920 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method for three-phase motor startup, comprising:
   receiving differential outputs from a magnetic field sensing element;
   generating a polarity signal from the differential outputs;
   receiving the differential outputs and generating an amplitude signal;
   generating a motor direction drive signal from the polarity signal; and
   generating sinusoidal motor drive signals during the motor startup from a measured motor current signal and the amplitude signal, wherein the motor drive signals drive the motor in a direction corresponding to the motor direction drive signal.

2. The method according to claim 1, wherein the magnetic field sensing element comprises a Hall element.

3. The method according to claim 1, wherein the sinusoidal motor drive signals during motor startup are generated from a single Hall element, which comprises the magnetic field sensing element.

4. The method according to claim 3, wherein the motor direction drive signal corresponds to a position of the signal Hall element in relation to phases of the motor.

5. The method according to claim 1, wherein the magnetic field sensing element comprises an anisotropic magnetoresistance (AMR) element.

6. The method according to claim 1, wherein the magnetic field sensing element comprises a giant magnetoresistance (GMR) element.

7. The method according to claim 1, wherein the magnetic field sensing element comprises a tunneling magnetoresistance (TMR) element.

8. The method according to claim 1, further including using a comparator to generate the polarity signal.

9. The method according to claim 1, further including rectifying the differential outputs to generating the amplitude signal.

10. The method according to claim 1, further including using a proportional-integral (PI) controller to generate a control vector amplitude signal for a PWM signal generator from the amplitude signal and the measured motor current.

11. The method according to claim 1, wherein the motor comprises a brushless DC motor.

12. A motor controller system comprising:
   a control module configured to receive polarity information generated from differential outputs that are output by a magnetic field sensing element positioned in relation to phases of a three-phase motor and amplitude information generated from the differential outputs that are output by the magnetic field sensing element, the control module configured to generate a motor driving direction signal corresponding to the received polarity information and to generate an amplitude control signal from the amplitude information and a measured motor current information; and
   a pulse width modulation (PWM) module configured to receive the amplitude control signal and the motor driving direction signal and generate control signals for switching elements driving the motor that provide sinusoidal phase currents to the motor during startup, wherein the motor drive signals drive the motor in a direction corresponding to the motor direction drive signal.

13. The system according to claim 12, wherein the magnetic field sensing element comprises a Hall element.

14. The system according to claim 12, wherein the sinusoidal motor drive signals during motor startup are generated from a single Hall element, which comprises the magnetic field sensing element.

15. The system according to claim 14, wherein the motor direction drive signal corresponds to a position of the signal Hall element in relation to phases of the motor.

16. The system according to claim 12, further including a comparator to generate the polarity signal.

17. The system according to claim 12, further including rectifying the differential outputs to generating the amplitude signal.

18. The system according to claim 12, further including a proportional-integral (PI) controller to generate a control vector amplitude signal for a PWM signal generator from the amplitude signal and the measured motor current.

19. The system according to claim 12, wherein the motor comprises a brushless DC motor.

20. The system according to claim 12, wherein the magnetic field sensing element comprises an anisotropic magnetoresistance (AMR) element.

21. The system according to claim 12, wherein the magnetic field sensing element comprises a giant magnetoresistance (GMR) element.

22. The system according to claim 12, wherein the magnetic field sensing element comprises a tunneling magnetoresistance (TMR) element.

23. A motor controller system comprising:
   a control means for receiving polarity information generated from differential outputs that are output by a magnetic field sensing element positioned in relation to phases of a three-phase motor and amplitude information generated from the differential outputs that are output by the magnetic field sensing element, and to generate a motor driving direction signal corresponding to the received polarity information and to generate an amplitude control signal from the amplitude information and the motor current information; and
   a pulse width modulation (PWM) means for receiving the amplitude control signal and the motor driving direction signal and generate control signals for switching elements driving the motor that provide sinusoidal phase currents to the motor during startup, wherein the motor drive signals drive the motor in a direction corresponding to the motor direction drive signal.

24. The system according to claim 23, wherein the magnetic field sensing element comprises a Hall element.

25. The system according to claim 23, wherein the sinusoidal motor drive signals during motor startup are generated from a single Hall element, which comprises the magnetic field sensing element.

26. The system according to claim 25, wherein the motor direction drive signal corresponds to a position of the signal Hall element in relation to phases of the motor.

27. The system according to claim 23, further including a rectifier coupled to the differential outputs to generate the amplitude signal.

28. The system according to claim 23, further including a proportional-integral (PI) controller means for generating a control vector amplitude signal for a PWM signal generator from the amplitude signal and the measured motor current.

29. The system according to claim 23, wherein the motor comprises a brushless DC motor.

30. The system according to claim 23, wherein the magnetic field sensing element comprises an anisotropic magnetoresistance (AMR) element.

31. The system according to claim 23, wherein the magnetic field sensing element comprises a giant magnetoresistance (GMR) element.

32. The system according to claim 23, wherein the magnetic field sensing element comprises a tunneling magnetoresistance (TMR) element.

* * * * *